United States Patent
Schwindt

(10) Patent No.: US 12,522,249 B2
(45) Date of Patent: Jan. 13, 2026

(54) CREATING A REPRESENTATION OF VISIBLE SPACE AROUND A MACHINE USING A PREVIOUSLY DETERMINED COMBINED OCCUPANCY GRID

(71) Applicant: Robert Bosch GmbH, Stuttgart (DE)

(72) Inventor: Oliver Frank Schwindt, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 189 days.

(21) Appl. No.: 18/501,794

(22) Filed: Nov. 3, 2023

(65) Prior Publication Data

US 2025/0145181 A1   May 8, 2025

(51) Int. Cl.
*B60W 60/00* (2020.01)
*B60W 50/00* (2006.01)
*G01C 21/00* (2006.01)
*G05D 1/246* (2024.01)

(52) U.S. Cl.
CPC .. *B60W 60/00274* (2020.02); *B60W 50/0097* (2013.01); *G01C 21/3844* (2020.08); *G01C 21/3881* (2020.08); *G05D 1/2464* (2024.01); *B60W 2420/403* (2013.01); *B60W 2420/408* (2024.01); *B60W 2554/4041* (2020.02); *B60W 2554/4045* (2020.02); *B60W 2556/10* (2020.02); *B60W 2556/40* (2020.02)

(58) Field of Classification Search
None
See application file for complete search history.

(56) References Cited

U.S. PATENT DOCUMENTS

| | | |
|---|---|---|
| 11,702,070 B2 | 7/2023 | Wray et al. |
| 11,740,633 B2 | 8/2023 | Gier et al. |
| 2020/0377108 A1* | 12/2020 | Balazs ................. G06V 10/803 |
| 2022/0107204 A1 | 4/2022 | Sergeev et al. |
| 2022/0126875 A1 | 4/2022 | Hammoud |
| 2022/0196410 A1* | 6/2022 | Hines ................. G01C 21/3826 |
| 2022/0350337 A1 | 11/2022 | Silva et al. |
| 2023/0147874 A1 | 5/2023 | Govardhanam |
| 2024/0190461 A1 | 6/2024 | Schwindt et al. |
| 2025/0138546 A1* | 5/2025 | Appaya Dhanabalan ................... G05D 1/2464 |

* cited by examiner

*Primary Examiner* — Christian Chace
*Assistant Examiner* — Shayne M. Gilbertson
(74) *Attorney, Agent, or Firm* — Michael Best & Friedrich LLP

(57) ABSTRACT

A system for creating a representation of visible space around a machine using a previously determined combined occupancy grid. The system includes a plurality of sensors and an electronic processor. The electronic processor is configured to determine a combined occupancy grid associated with a first time, wherein the combined occupancy grid is determined based on sensor data associated with the first time and received from the plurality of sensors. The electronic processor is also configured to receive, from the plurality of sensors, sensor data associated with a second time and determine a representation of visible space associated with the second time based on the combined occupancy grid associated with the first time and the sensor data associated with the second time. The electronic processor is further configured to control a movement of the machine based on the representation of visible space associated with the second time.

18 Claims, 6 Drawing Sheets

CREATING A REPRESENTATION OF VISIBLE SPACE AROUND A MACHINE USING A PREVIOUSLY DETERMINED COMBINED OCCUPANCY GRID

SUMMARY

Grid maps include a set of cells associated with respective positions or locations in the environment surrounding a machine. The cells, which may be 2D cells or 3D voxels, include occupancy information relating to static or dynamic features of the environment. For example, a cell may be assigned an occupancy probability or occupancy value that represents the likelihood that a feature is at the location in the environment associated with the cell.

Static features are stationary features of the environment. Static features include, for example, guard rails, curbs, buildings, sidewalks, parked vehicles, construction site equipment, trash collection bins, and under-drivable structures (e.g., bridges, overhanging signs, overhanging wires). Dynamic features are non-stationary features of the environment. Dynamic features include, for example, pedestrians, moving vehicles, and animals.

In some instances, grid maps are single layer maps or multi-layer grid maps, wherein each layer comprises a set of cells storing information relating to a type of feature. For example, the multi-layer grid may include an occupancy layer, such as a static occupancy layer and/or a dynamic occupancy layer. In some implementations, the multi-layer grid includes a visibility layer or a representation of visible space. The visibility layer includes a plurality of cells marking visible space. Visible space is empty space that is currently visible (in other words, one or more sensors of a vehicle are able to perceive the space) and is not occupied by any obstacle or occluding object. In some instances, the multi-layer grid further includes a ground surface layer and a road marking layer. The ground surface layer may include information relating to ground semantics, such as ground elevation, ground surface type (e.g., grass, asphalt, gravel), or ground surface friction. The road marking layer may include information relating to road markings, detour signage, or traffic flow.

Autonomous or semi-autonomous machines such as vehicles or robots may rely on grid maps storing probabilistic information relating to features of an environment in order to control vehicle movement in the environment. The embodiments described herein relate to the visibility layer of grid maps. For example, a representation of visible space may be used by a vehicle with autonomous or semi-autonomous functionality when navigating a round-about, navigating an unprotected turn intersection, determining a safe speed of travel, and performing a lane change.

Some existing systems and methods for determining representations of visible space include assuming that each sensor included in the machine is mounted on the machine at the same position and making a star-shaped polygon around the center of a machine. Because not all sensors included in the machine are mounted at the same position, such existing systems and methods do not provide a very accurate representation of visible space.

One example implementation provides a system for creating a representation of visible space around a machine using a previously determined combined occupancy grid. The system includes a plurality of sensors and an electronic processor. The electronic processor is configured to determine a combined occupancy grid associated with a first time, wherein the combined occupancy grid is determined based on sensor data associated with the first time and received from the plurality of sensors. The electronic processor is also configured to receive, from the plurality of sensors, sensor data associated with a second time and determine a representation of visible space associated with the second time based on the combined occupancy grid associated with the first time and the sensor data associated with the second time. The electronic processor is further configured to control a movement of the machine based on the representation of visible space associated with the second time.

Another example implementation provides a method for creating a representation of visible space around a machine using a previously determined combined occupancy grid. The method includes determining a combined occupancy grid associated with a first time, wherein the combined occupancy grid is determined based on sensor data associated with the first time and received from a plurality of sensors. The method also includes receiving, from the plurality of sensors, sensor data associated with a second time and determining a representation of visible space associated with the second time based on the combined occupancy grid associated with the first time and the sensor data associated with the second time. The method further includes controlling a movement of the machine based on the representation of visible space associated with the second time.

DETAILED DESCRIPTION

Figure 1:
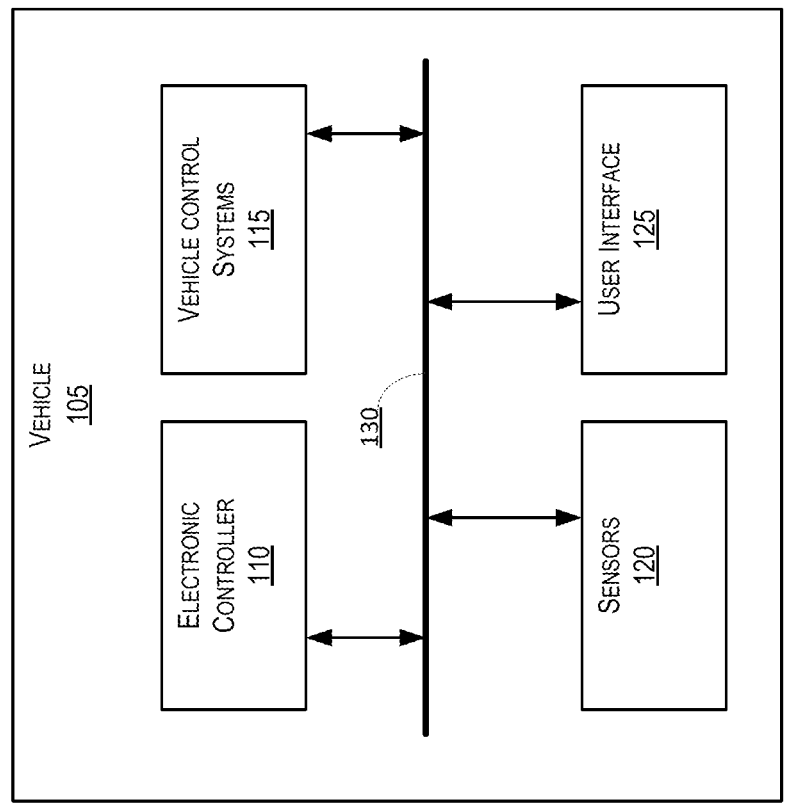
FIG. 1 schematically illustrates an example system for creating a representation of visible space around a machine using a previously determined combined occupancy grid.

Before any aspects, features, or instances are explained in detail, it is to be understood that the aspects, features, or instances are not limited in their application to the details of construction and the arrangement of components set forth in the following description or illustrated in the following drawings. Other instances are possible and are capable of being practiced or of being carried out in various ways.

Also, it is to be understood that the phraseology and terminology used herein is for the purpose of description and should not be regarded as limiting. The terms "mounted," "connected" and "coupled" are used broadly and encompass both direct and indirect mounting, connecting, and coupling. Further, "connected" and "coupled" are not restricted to physical or mechanical connections or couplings, and can include electrical connections or couplings, whether direct or indirect. Also, electronic communications and notifications may be performed using any known means including wired connections, wireless connections, etc.

It should also be noted that a plurality of hardware and software based devices, as well as a plurality of different structural components may be utilized in various implementations. Aspects, features, and instances may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one instance, the electronic based aspects of the invention may be implemented in software (for example, stored on non-transitory computer-readable medium) executable by one or more processors. As a consequence, it should be noted that a plurality of hardware and software based devices, as well as a plurality of different structural components may be utilized to implement the invention. For example, "control units" and "controllers" described in the specification can include one or more electronic processors, one or more memory modules including a non-transitory computer-readable medium, one or more input/output interfaces, and various connections (for example, a system bus) connecting the components. It should be understood that although certain drawings illustrate hardware and software located within particular devices, these depictions are for illustrative purposes only. In some instances, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

For ease of description, some or all of the example systems presented herein are illustrated with a single exemplar of each of its component parts. Some examples may not describe or illustrate all components of the systems. Other instances may include more or fewer of each of the illustrated components, may combine some components, or may include additional or alternative components.

FIG. 1 schematically illustrates an example system 100 for creating a representation of visible space around a machine using a previously determined combined occupancy grid. In the illustrated example, the system 100 includes a machine such as a vehicle 105. While the machine included in the system 100 is illustrated and described herein as the vehicle 105 with autonomous or semi-autonomous functionality, the methods described herein may be applied to any machine or robot with autonomous of semi-autonomous functionality. The vehicle 105 includes an electronic controller 110, a plurality of vehicle control systems 115, a plurality of sensors 120, and a user interface 125. The components of the vehicle 105, along with other various modules and components are electrically and communicatively coupled to each other via direct connections or by or through one or more control or data buses (for example, the bus 130), which enable communication therebetween. In some instances, the bus 130 is a Controller Area Network (CAN™) bus. In some instances, the bus 130 is an automotive Ethernet™, a FlexRay™ communications bus, or another suitable bus. In alternative instances, some or all of the components of the vehicle 105 may be communicatively coupled using suitable wireless modalities (for example, Bluetooth™ or near field communication connections).

The electronic controller 110 (described in greater detail below with respect to FIG. 2) communicates with the vehicle control systems 115 and the sensors 120. The electronic controller 110 may receive sensor data from the sensors 120 and determine control commands for the vehicle 105. The electronic controller 110 transmits the control commands to, among other things, the vehicle control systems 115 to operate or assist in operating the vehicle 105 (for example, by generating braking signals, acceleration signals, steering signals, or the like). In some instances, the electronic controller 110 is part of one or more vehicle controllers that implement autonomous or semi-autonomous functions of the vehicle 105.

The vehicle control systems 115 may include controllers, actuators, and the like for controlling operation of the vehicle 105 (for example, acceleration, braking, shifting gears, and the like). The vehicle control systems 115 communicate with the electronic controller 110 via the bus 130.

The sensors 120 determine one or more attributes of the vehicle 105 and its surrounding environment and communicate information regarding those attributes to other components of the vehicle 105 using, for example, messages transmitted on the bus 130. The sensors 120 may include, for example, vehicle control sensors, such as, for example, sensors that detect accelerator pedal position and brake pedal position, wheel speed sensors, vehicle speed sensors, yaw, pitch, and roll sensors, force sensors, and vehicle proximity sensors (for example, imaging devices and ultrasonic sensors). In some instances, the sensors 120 include one or more cameras or other imaging devices configured to capture one or more images of the environment surrounding the vehicle 105. Radar and lidar sensors may also be used. The sensors 120 may each include an electronic processor configured to process raw sensor data before outputting sensor information to other components of the vehicle 105, such as the electronic controller 110.

In some instances, the electronic controller 110 controls aspects of the vehicle 105 based on commands received from the user interface 125. The user interface 125 provides an interface between the components of the vehicle 105 and an occupant (for example, a driver) of the vehicle 105. The user interface 125 is configured to receive input from the occupant, receive indications of vehicle status from the system's controllers (for example, the electronic controller 110), and provide information to the driver based on the received indications. The user interface 125 provides visual output, such as, for example, graphical indicators (for example, fixed or animated icons), lights, colors, text, images, combinations of the foregoing, and the like. The user interface 125 includes a suitable display mechanism for displaying the visual output, such as, for example, a liquid crystal display (LCD) touch screen, or an organic light-emitting diode (OLED) touch screen), or other suitable mechanisms. In some instances, the user interface 125 displays a graphical user interface (GUI) (for example, generated by the electronic controller 110 and presented on a display screen) that enables a driver or passenger to interact with the vehicle 105. The user interface 125 may also provide audio output to the driver via a chime, buzzer, speaker, or other suitable device included in the user interface 125 or separate from the user interface 125. In some instances, user interface 125 provides haptic outputs to the driver by vibrating one or more vehicle components (for example, the vehicle's steering wheel, a seat, or the like), for example, using a vibration motor. In some instances, the user interface 125 provides a combination of visual, audio, and haptic outputs.

Figure 2:
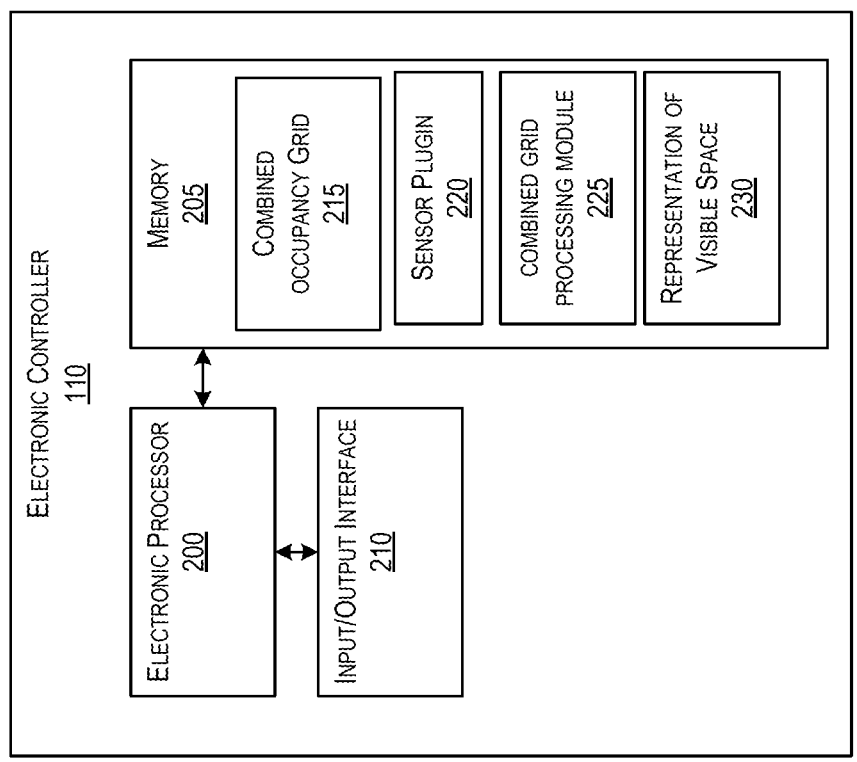
FIG. 2 schematically illustrates an example electronic controller included in the system of FIG. 1.

FIG. 2 illustrates an example of the electronic controller 110, which includes an electronic processor 200 (for example, a microprocessor, application specific integrated circuit, etc.), a memory 205, and an input/output interface 210. The memory 205 may be made up of one or more non-transitory computer-readable media and include at least a program storage area and a data storage area. The program storage area and the data storage area can include combinations of different types of memory, such as read-only memory ("ROM"), random access memory ("RAM"), electrically erasable programmable read-only memory ("EEPROM"), flash memory, or other suitable memory devices. The electronic processor 200 is coupled to the memory 205 and the input/output interface 210. The electronic processor 200 sends and receives information (for example, from the memory 205 and/or the input/output interface 210) and processes the information by executing one or more software instructions or modules, capable of being stored in the memory 205, or another non-transitory computer readable medium. The software can include firmware, one or more applications, program data, filters, rules, one or more program modules, and other executable instructions. The electronic processor 200 is configured to retrieve from the memory 205 and execute, among other things, software for performing methods as described herein. In the example illustrated, the memory 205 stores, among other things, a combined occupancy grid 215 for storing information regarding the locations of objects in an environment surrounding the vehicle 105 and a representation of visible space 230. The memory also stores one or more instances of a sensor plugin 220 and a combined grid processing module 225. The input/output interface 210 transmits and receives information from devices external to the electronic controller 110 (for example, components of the vehicle 105 via the bus 130).

Figure 3:
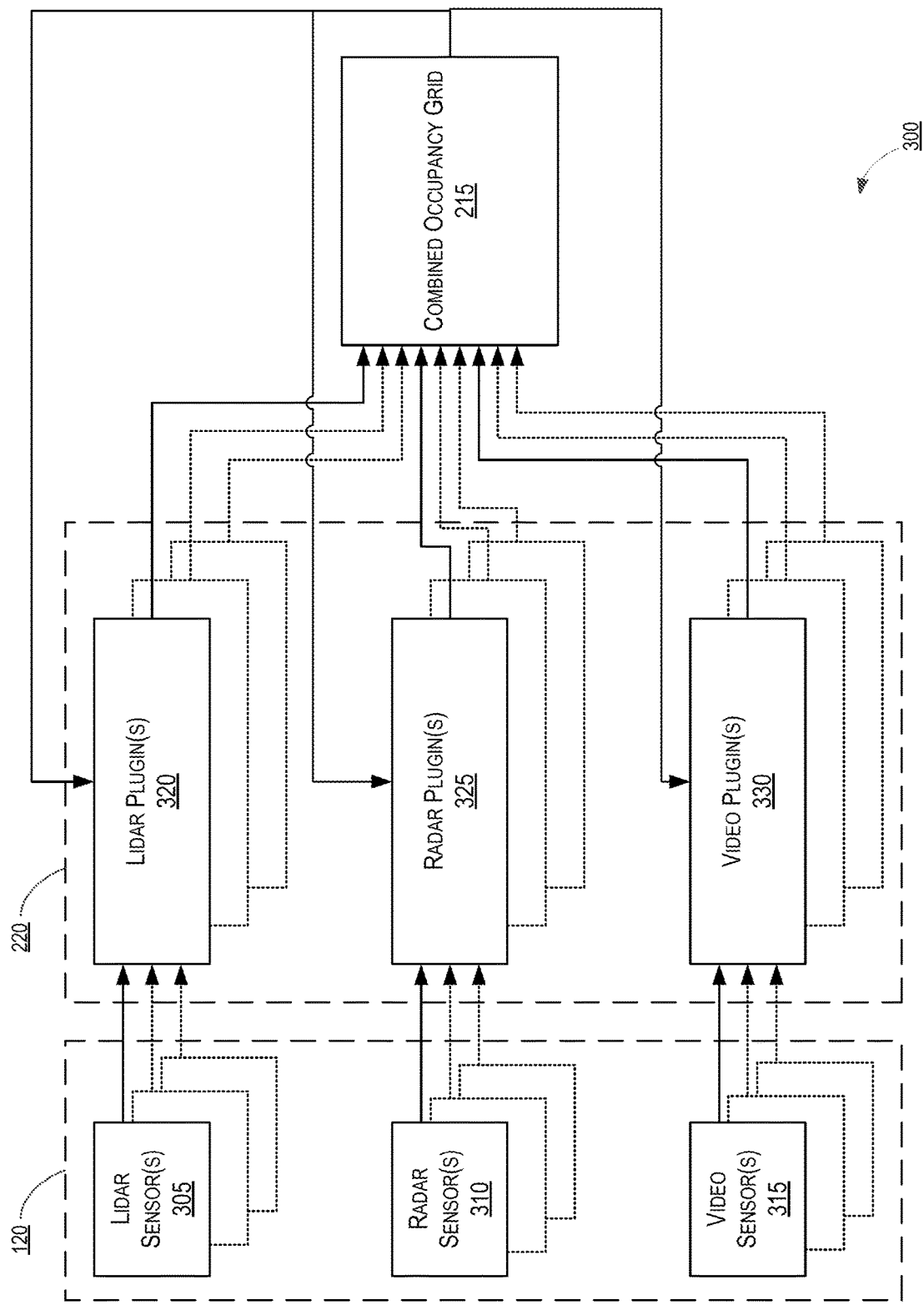
FIG. 3 illustrates an example sensor configuration for implementing the method of FIG. 4.
Figure 4:
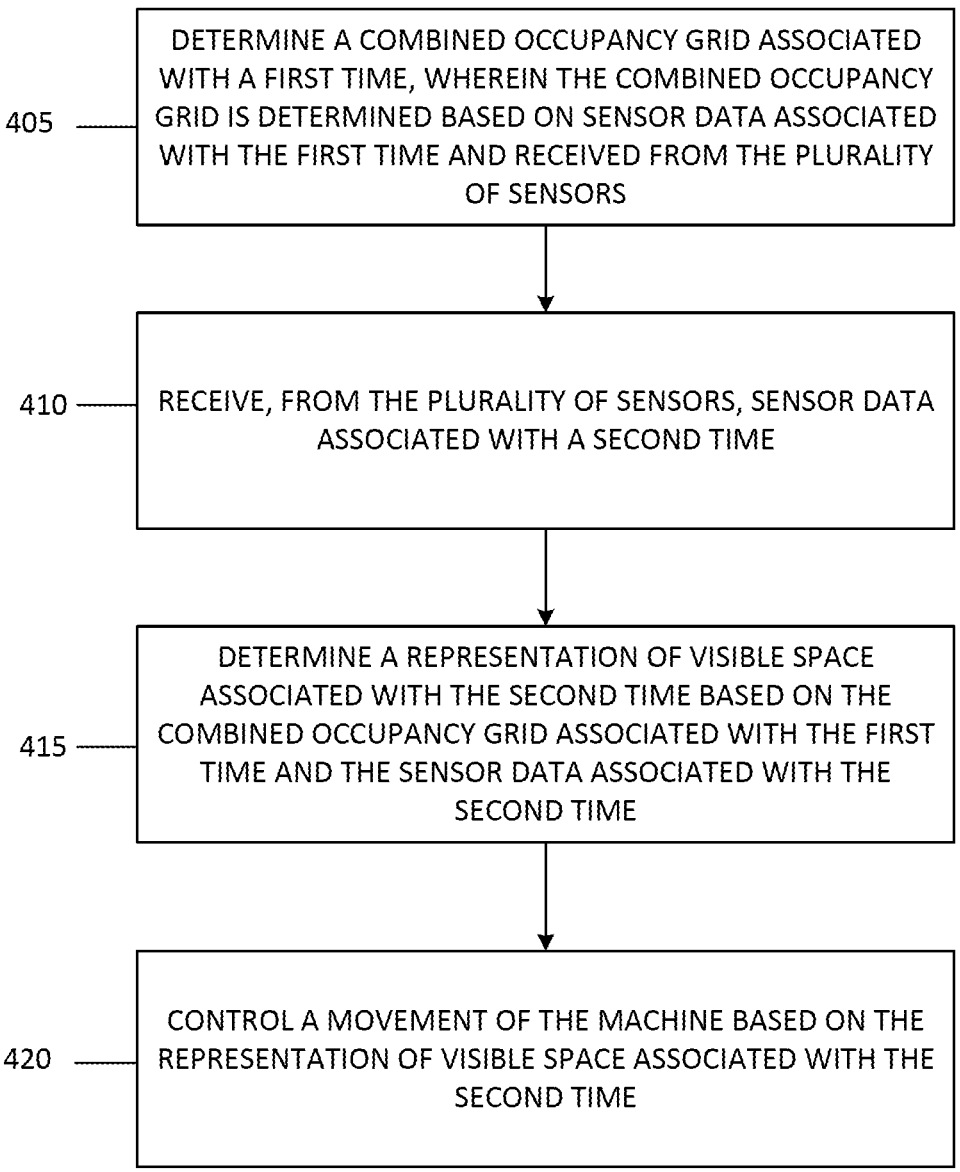
FIG. 4 provides a flowchart of an example method for creating a representation of visible space around a machine using a previously determined combined occupancy grid.

FIG. 3 schematically illustrates an example sensor configuration 300 for implementing the method of FIG. 4. The plurality of sensors 120 may include one or more lidar sensors 305 configured to output lidar data, one or more radar sensors 310 configured to output radar data, and one or more video sensors 315 or cameras configured to output video data or image data. The sensor configuration 300 also includes each instance of the one or more instances of the sensor plugin 220. For example, for each of the lidar sensors 305, the electronic processor 200 generates an instance of a lidar plugin 320. For each of the radar sensors 310, the electronic processor 200 generates an instance of a radar plugin 325. For each of the video sensors 315, the electronic processor 200 generates an instance of a video plugin 330. The sensor configuration 300 further includes the combined occupancy grid 215. In some instances, the combined occupancy grid 215 provides feedback to each instance of the sensor plugin 220, such that each instance of the sensor plugin 220 receives a repeatedly-updated combined occupancy grid 215 including sensor information previously integrated from each of the plurality of sensors 120.

In some instances, the plurality of sensors 120 include predetermined groups of sensors, and a sensor plugin 220 is instantiated once for each group of sensors. For example, the electronic processor 200 may instantiate a first sensor plugin for processing sensor information from a first group of sensors, and instantiate a second sensor plugin for processing sensor information from a second group of sensors. The first group of sensors may include, for example, sensors of different modalities that output sensor information corresponding to overlapping or neighboring positions in the environment. The second group of sensors may include, for example, sensors of the same modality that output sensor information corresponding to overlapping or neighboring positions in the environment. In some instances, the sensor information output by sensors of the same group of sensors include the same timestamps or timestamps of negligible differences.

FIG. 4 provides an example method 400 for creating a representation of visible space around a machine using a previously determined combined occupancy grid. In some implementations, the method 400 begins at step 405 when the electronic processor 200 determines a combined occupancy grid associated with a particular moment (which is referred to as a first time, even though the moment may not be an initial time), wherein the combined occupancy grid is determined based on sensor data associated with the first time and received from the plurality of sensors 120. At step 410, the electronic processor 200 receives, from the plurality of sensors 120, sensor data associated with another particular moment (referred to as a second time, although the moment does not need to be second in a sequence).

At step 415, the electronic processor 200 may determine a representation of visible space associated with the second time based on the combined occupancy grid associated with the first time and the sensor data associated with the second time. In some implementations, the first time is the time associated with what is the most recently created combined occupancy grid/representation of visible space at the second time. For example, the first time is 1 second and the second time is 1.2 seconds and no combined occupancy grid/ representation of visible space has been determined by the electronic processor 200 that is associated with a time between 1 second and 1.2 seconds.

In some implementations, step 415 includes the electronic processor 200 defining a space surrounding the vehicle 105 which is to be represented in a combined occupancy grid associated with the second time and a representation of visible space associated with the second time. For example, the vehicle 105 may have the same orientation in the combined occupancy grid/representation of visible space associated with the second time as the vehicle 105 had in a combined occupancy grid/representation of visible space associated with the first time but the combined occupancy grid/representation of visible space associated with the second time may be shifted a number of cells (for example, a number of cells based on the speed of the vehicle) from the combined occupancy grid/representation of visible space associated with the first time. In one example, the vehicle 105 is in the center of the defined space. In another example, when the vehicle 105 is traveling forward, the vehicle 105 is offset from the center of the defined space so that there is a greater distance from the front of the vehicle 105 to the edge of the defined space in front of the vehicle 105 than there is from the rear of the vehicle 105 to the edge of the defined space behind the vehicle 105.

Figure 5:
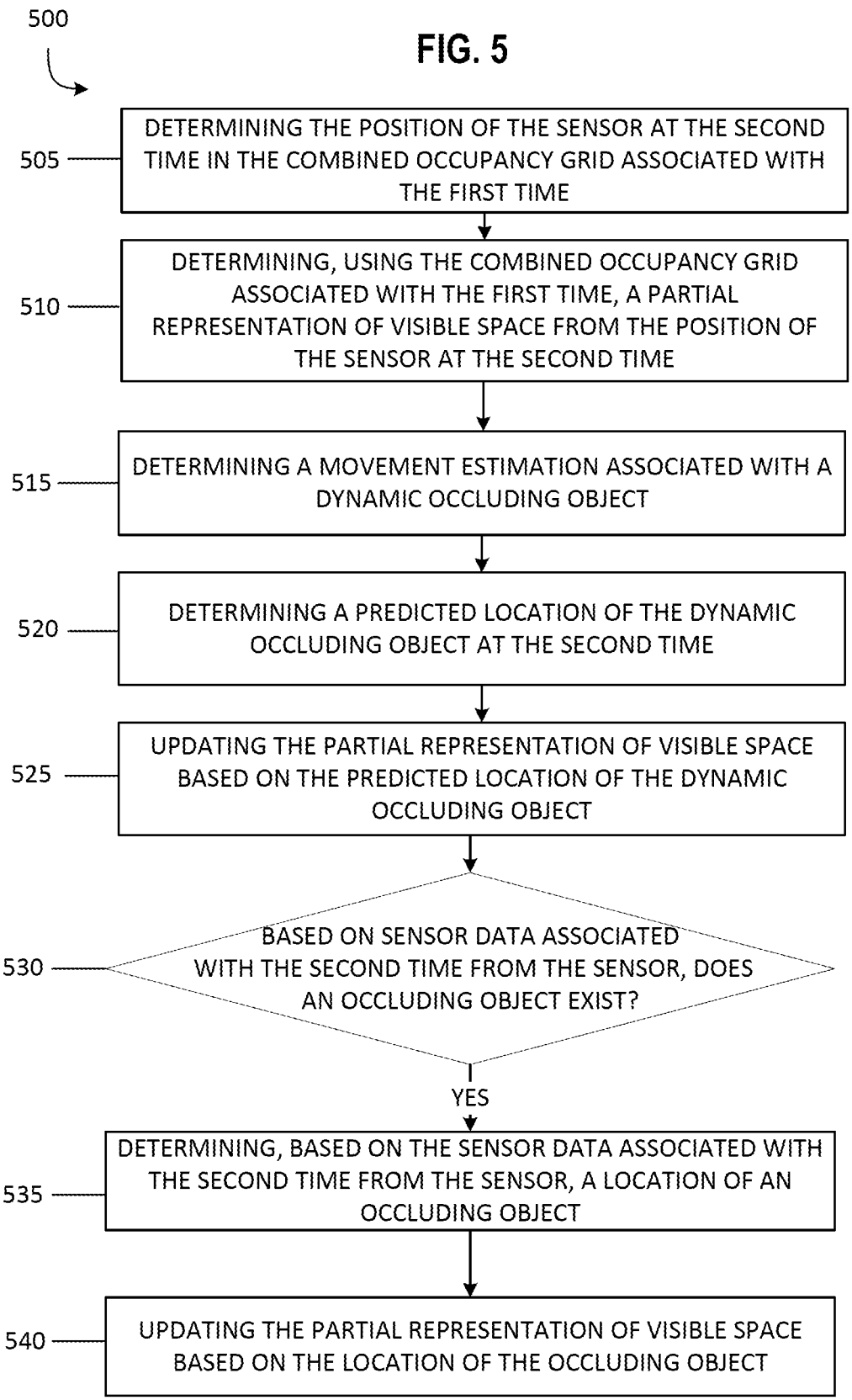
FIG. 5 provides a flowchart of an example method performed for each sensor of a plurality of sensors of the system of FIG. 1 to create a representation of visible space.

FIG. 5 provides a flowchart of an example method 500 performed by the electronic processor 200 for each sensor of the plurality of sensors in order to perform step 415 of the method 400. In some implementations, the method 500 is performed for a sensor of the plurality of sensors 120 when the electronic processor 200 executes an instance of the sensor plugin 220 associated with the sensor. In some implementations, at step 505, the electronic processor 200, for each sensor included in the plurality of sensors 120, determines the position of the sensor at the second time in the combined occupancy grid associated with the first time. In some implementations, when the sensor is a rotating sensor with a rotation speed below a predetermined threshold, the electronic processor 200 may also determine a rotational position of the sensor. The electronic processor 200 may determine the rotational position of the sensor to be a rotational path the sensor took between a start time of a scan and an end time of the scan or a position of the sensor at an average scan time. In some implementations, the rotating sensor may be associated with a discrete number of sensor positions and the electronic processor 200 may use the discrete number of sensor positions to group the sensor data into smaller intervals than from scan start time to scan end time. In other implementations, the electronic processor 200 may determine the rotational position of the sensor to be a position of the sensor at each timestamp associated with the sensor data. In some implementations, at step 510, the electronic processor 200 determines, using the combined occupancy grid associated with the first time, a partial representation of visible space from the position of the sensor at the second time.

In some implementations, at step 515, the electronic processor 200 determines a movement estimation associated with a dynamic occluding object. In one example embodiment, the instance of the sensor plugin 220 being executed by the electronic processor 200 may receive the movement estimation from a software component (for example, a movement model) included in the memory 205 that, when executed, determines movement estimations for dynamic objects. At step 520, the electronic processor 200 may determine a predicted location of the dynamic occluding object at the second time. At step 525, the electronic processor 200 may update the partial representation of visible space based on the predicted location of the dynamic occluding object. Furthermore, in some implementations, relying only on the sensor data associated with the second time leaves the possibility that the electronic processor 200 incorrectly determines that there are one or more holes in an occluding object. For example, a radar sensor may detect the retro-reflectors on a vehicle (an occluding object) but, because these are strong reflectors, the radar sensor may not detect the metal between the two rear lights of the vehicle. In another example, when observing the side of a parked vehicle (an occluding object) at a shallow angle, a lidar sensor may detect the entire rear end of the parked vehicle and individual parts of the side of the parked vehicle such as the side mirror and wheel wells, but may not detect the relatively flat metal body of the parked vehicle. Incorrectly determining one or more holes in an occluding object may be avoided when the electronic processor 200 uses a dynamic grid or movement estimations from the movement model because, for example, the movement model uses oriented bounding boxes to represent vehicles.

At step 530, the electronic processor 200 also determines, based on sensor data associated with the second time from the sensor, whether one or more occluding objects exist. When one or more occluding objects exist, the electronic processor 200 determines, at step 535, one or more locations of the one or more occluding objects obscuring visibility and updates the partial representation of visible space based on the one or more locations of the one or more occluding objects. At step 540, the electronic processor 200 updates the partial representation of visible space based on the location of the occluding object. In some implementations, when an angular separability between two locations perceived by a sensor (for example, a radar sensor which has an angular separation between its measurements of 1 degree or more) as including occluding objects is less than a predetermined threshold associated with the sensor, the electronic processor 200 marks visibility between the two locations as ending at a distance associated with a distance of the occluding objects perceived by the sensor at the two locations. In other words, when there is such a small distance between occluding objects, that the sensor is unable to determine if the two occluding objects in the two locations are, in reality, one object or two separate objects, the electronic processor 200 treats the occluding objects as if they were one object. In some implementations, the electronic processor 200, prepares and sends the partial representation of visible space to the combined grid processing module 225.

In some implantations, the electronic processor 200, executing the combined grid processing module 225, may combine each partial representation of visible space determined for each sensor to create the representation of visible space associated with the second time. The electronic processor 200 may also remove static trails from known dynamic objects.

To ensure that a visibility layer (a representation of visible space) and an occupancy layer (a combined occupancy grid) included in a grid map are consistent with one another and to ensure that the representation of visible space does not reflect noisy sensor data, the electronic processor 200 may delay marking a space included in the representation of visible space as visible or obscured.

Therefore, in some implementations, each cell of a plurality of cells included in the representation of visible space associated with a second time is associated with a count. Each cell is also marked as visible or obscured. In some implementations, for each cell of the plurality of cells, the electronic processor 200 sets a count associated with the cell to zero when the cell represents a location not included in a most previous representation of visible space (for example, a representation of visible space associated with the first time). In one example, the count is an integer value. In another example, the count is a time value. In some implementations, the electronic processor 200 also marks the cell as obscured when the cell represents a location not included in the most previous representation of visible space. In some implementations, each cell in the representation of visible space associated with a second time that is associated with a cell (a location) included in the most previous representation of visible space is assigned the count and visibility marking (visible or obscured) of the cell included in the most previous representation of visible space.

For each cell of the plurality of cells, the electronic processor 200 may then increase a count associated with the cell when the cell is perceived as visible at the second time by a sensor of the plurality of sensors 120 and decrease the count associated with the cell when the cell is not perceived as visible by any sensor included in the plurality of sensors 120 at the second time. In some implementations, the electronic processor 200 marks the cell as obscured in the representation of visible space associated with the second time when the count associated with the cell is zero and a cell in the most recent representation of visible space associated with the cell is marked visible. In some implementations, the electronic processor 200 marks the cell as visible in the representation of visible space associated with the second time when the count associated with the cell is equal to the predetermined threshold and the cell in the most recent representation of visible space associated with the cell is marked obscured.

In some implementations, the electronic processor 200 does not increase a count associated with a cell when the count associated with the cell is equal to the predetermined threshold, even if the cell is perceived as visible at the second time by a sensor of the plurality of sensors 120. The predetermined threshold may be an integer value of 3 or a time value of 300 milliseconds. In some implementations, the electronic processor 200 does not decrease a count associated with a cell when the count associated with the cell is 0, even if the cell is not perceived as visible by any sensor included in the plurality of sensors 120 at the second time.

Returning to the method 400, at step 420, the electronic processor 200 controls a movement of the machine (for example, the vehicle 105) based on the representation of visible space associated with the second time. For example, the electronic processor 200 may control the movement of the vehicle 105 based on the representation of visible space associated with a second time using one or more of the vehicle control systems 115. In some implementations, the representation of visible space associated with the second time is stored in the memory 205 so that it may be retrieved from memory 205 by the electronic processor 200 at a later time. In some implementations, since visible space is mutually exclusive to occupancy, the combined occupancy grid and representation of visible space associated with the second time are combined into one grid, wherein each cell of the grid has one byte information (for example, an enumerated list of classifications associated with an occluding object and a marking of visible or obscured) associated with it.

In some implementations, the representation of visible space associated with the second time includes a plurality of triangles with an apex at the point where a sensor's perception of ground begins and a base where a cell includes an occluding object. In other implementations, the apex may be at the sensor's location. The base of the triangle may be as large as the cell (for example, a distance between two corners or edges of the cell) that includes the occluding object. In other implementations, the representation of visible space associated with the second time includes a plurality of equally spaced polar slices with a base where a cell includes an occluding object. Equally spaced polar slices may be spatial slices which are the same number of angular degrees. In some implementations, the base of the polar slice is where any cell or part of a cell that includes an occluding object is encompassed by or included in the polar slice. The size of the base of the polar slice may be equal to a distance between the edges of the polar slice at a location where an occluding object blocks visibility. Triangles or polar slices that make up a representation of visible space may be referred to as rays.

In some implementations, the representation of visible space associated with the second time considers the height of occluding objects. For example, the electronic processor 200 may, using a height estimation associated with an occluding object, determine whether a space over or under the occluding object is visible to a sensor and, when the space over or under the occluding object is visible to a sensor, determine a space beyond the occluding object to be visible.

In some implementations, the electronic processor 200 projects rays representing two-dimensional visibility to the ground in the environment of the vehicle to create a three-dimensional representation of visible space. In some implementations, the electronic processor 200 determines a ground elevation estimation using sensors included in the plurality of sensors 120 or a map (for example, a map included in the memory 205). In some implementations, the rays may be projected by the electronic processor 200 to a height or a level (for example, 30 cm) above the ground. The height that the rays are projected to should be low enough to the ground to ensure that relevant occluding objects are included in the representation of visible space but high enough to ensure that the representation of visible space does not include small objects such as curbs. In some implementations, the electronic processor 200 may require an entire interval between the ground and a predefined height to be visible without interruption before determining the interval to be visible.

In some implementations, the electronic processor 200 may use the ground elevation estimation to determine whether a space is visible. For example, the ground may cause occlusions (for example, when observing the crest of the hill, the ground behind the hill or a level above the ground behind the hill is not necessarily visible).

Figure 6:
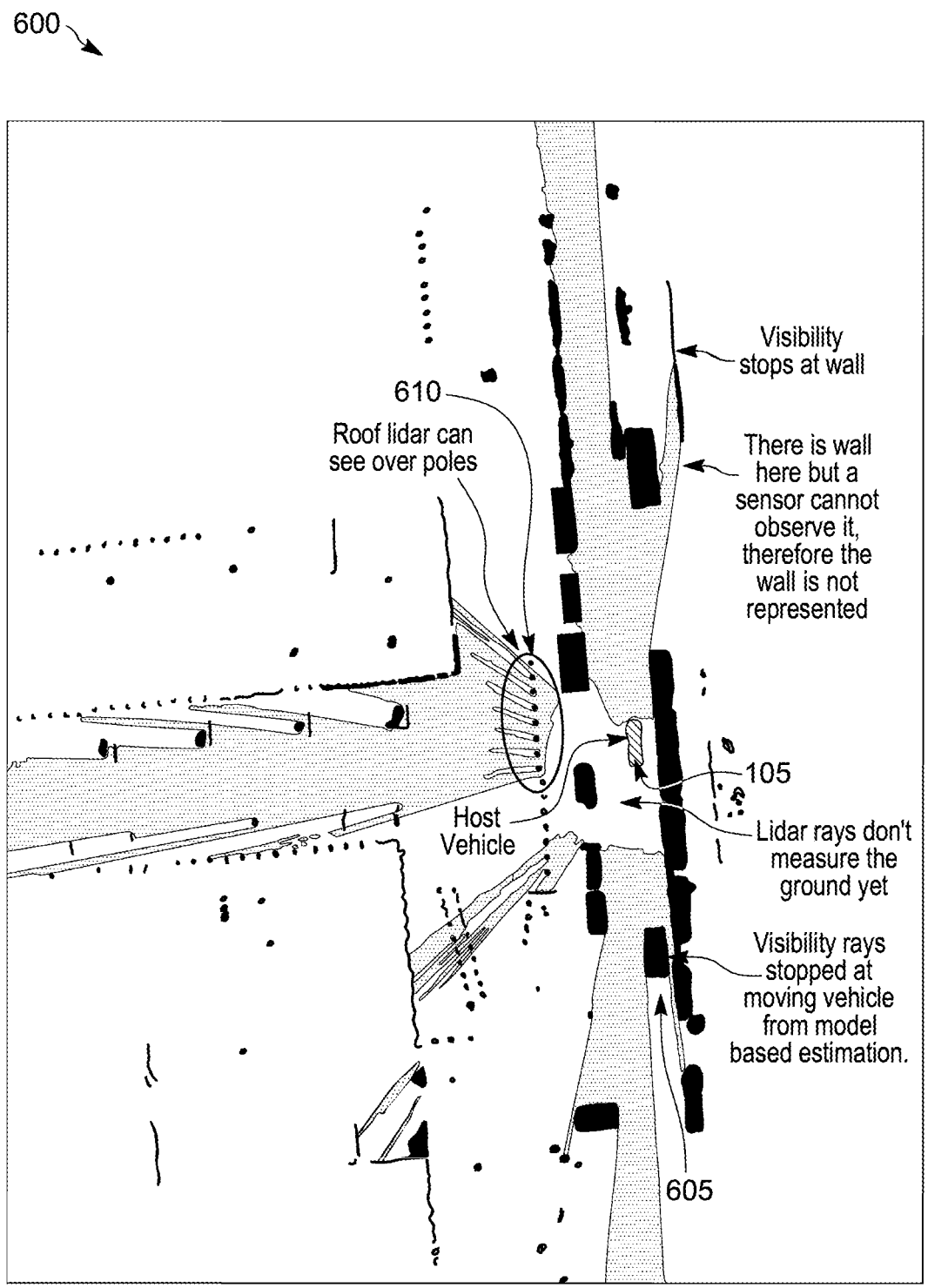
FIG. 6 is an example representation of visible space.

FIG. 6 is an example representation of visible space 600 of an environment of the vehicle 105. In FIG. 6, the vehicle 105 is oriented so that the front of the vehicle 105 is facing the top of the page. The white areas of the representation of visible space 600 are areas that are not visible to one or more of the plurality of sensors 120. Part of the area immediately surrounding the vehicle 105 is not marked as visible because one or more sensors (for example, lidar sensors) mounted on the side of the vehicle 105 are not able to perceive the ground in the area immediately surrounding the vehicle 105. The stippled areas of the representation of visible space 600 are areas that are visible to one or more of the plurality of sensors 120. The representation of visible space 600 includes multiple occluding objects illustrated in black which obscure visibility. For example, the vehicle 605 is a dynamic occluding object that blocks one or more visibility rays. The poles 610 are static occluding objects which one or more sensors of the plurality of sensors 120 (for example, a lidar sensor mounted on the roof of the vehicle 105) can see over. Therefore, after a certain distance, the space behind the poles 610 is marked as visible. It should be noted that there are portions of FIG. 6 where dark lines are drawn, but these dark lines do not necessarily obscure visibility as one or more sensors of the plurality of sensors 120 may be able to perceive the area beyond these dark lines.

Thus, examples, aspects, and features herein provide, among other things, systems and methods for creating a representation of visible space around a machine using a previously determined combined occupancy grid.

What is claimed is:

1. A system for creating a representation of visible space around a machine using a previously determined combined occupancy grid, the system comprising:
   a plurality of sensors; and
   an electronic processor, the electronic processor configured to
      determine a combined occupancy grid associated with a first time, wherein the combined occupancy grid is determined based on sensor data associated with the first time and received from the plurality of sensors;
      receive, from the plurality of sensors, sensor data associated with a second time;
      determine a representation of visible space associated with the second time based on the combined occupancy grid associated with the first time and the sensor data associated with the second time by:
         for each sensor included in the plurality of sensors,
            determining a position of the sensor at the second time in the combined occupancy grid associated with the first time;
            determining, using the combined occupancy grid associated with the first time, a partial representation of visible space from the position of the sensor at the second time;
            determining, based on sensor data associated with the second time from the sensor, whether an occluding object exists; and when the occluding object exists,
   determining, based on the sensor data associated with the second time from the sensor, a location of the occluding object; and
   updating the partial representation of visible space based on the location of the occluding object; and
control a movement of the machine based on the representation of visible space associated with the second time.

2. The system according to claim 1, wherein the machine is a vehicle and the electronic processor is configured to control the movement of the vehicle using one or more vehicle control systems.

3. The system according to claim 1, wherein the electronic processor is configured to determine a representation of visible space associated with the second time based on the combined occupancy grid associated with the first time and the sensor data associated with the second time by
   determining a movement estimation associated with a dynamic occluding object;
   determining a predicted location of the dynamic occluding object at the second time; and
   updating the partial representation of visible space based on the predicted location of the dynamic occluding object.

4. The system according to claim 3, wherein the electronic processor is configured to determine a representation of visible space associated with the second time based on the combined occupancy grid associated with the first time and the sensor data associated with the second time by
   combining each partial representation of visible space determined for each sensor to create the representation of visible space.

5. The system according to claim 1, wherein the representation of visible space associated with the second time includes a plurality of triangles and each triangle of the plurality of triangles has an apex at a point where a sensor's perception of ground begins and a base where a cell includes an occluding object.

6. The system according to claim 1, wherein the representation of visible space associated with the second time includes a plurality of equally spaced polar slices and each polar slice of the plurality of equally spaces polar slices has a base where a cell included in the polar slice includes an occluding object.

7. The system according to claim 1, wherein the electronic processor is configured to determine a representation of visible space associated with the second time based on the combined occupancy grid associated with the first time and the sensor data associated with the second time by
   using a height estimation associated with an occluding object, determining whether a space over or under the occluding object is visible to a sensor of the plurality of sensors; and
   when the space over or under the occluding object is visible to the sensor, determining a space beyond the occluding object to be visible.

8. The system according to claim 1, wherein when an angular separability between two locations perceived by a sensor of the plurality of sensors as including occluding objects is less than a predetermined threshold associated with the sensor, mark visibility between the two locations as ending at a distance associated with a distance of the occluding objects perceived by the sensor at the two locations.

9. The system according to claim 1, wherein the representation of visible space associated with the second time includes a plurality of cells and each cell of the plurality of cells is associated with a count and is marked as visible or obscured.

10. The system according to claim 9, wherein the electronic processor is further configured to
   for each cell of the plurality of cells,
      when the cell represents a location not included in a most previous representation of visible space, set a count associated with the cell to zero and mark the cell as obscured;
      when the cell is perceived as visible at the second time by a sensor of the plurality of sensors, increase the count associated with the cell;
      when the cell is not perceived as visible by any sensor included in the plurality of sensors at the second time, decrease the count associated with the cell;
      when the count associated with the cell is zero and a cell in the most previous representation of visible space associated with the cell is marked visible, mark the cell as obscured in the representation of visible space associated with the second time; and
      when the count associated with the cell is equal to a predetermined threshold and the cell in the most recent representation of visible space associated with the cell is marked obscured, mark the cell as visible in the representation of visible space associated with the second time.

11. The system according to claim 1, wherein the plurality of sensors includes a radar sensor, a lidar sensor, a camera, or a combination of the foregoing.

12. A method for creating a representation of visible space around a machine using a previously determined combined occupancy grid, the method comprising:
   determining a combined occupancy grid associated with a first time, wherein the combined occupancy grid is determined based on sensor data associated with the first time and received from a plurality of sensors;
   receiving, from the plurality of sensors, sensor data associated with a second time;
   determining a representation of visible space associated with the second time based on the combined occupancy grid associated with the first time and the sensor data associated with the second time; and
   controlling a movement of the machine based on the representation of visible space associated with the second time, wherein determining a representation of visible space based on the combined occupancy grid associated with the first time and the sensor data associated with the second time includes
   for each sensor included in the plurality of sensors,
      determining a position of the sensor at the second time in the combined occupancy grid associated with the first time;
      determining, using the combined occupancy grid associated with the first time, a partial representation of visible space from the position of the sensor at the second time;
      determining, based on sensor data associated with the second time from the sensor, whether an occluding object exists; and
      when the occluding object exists,
         determining, based on the sensor data associated with the second time from the sensor, a location of the occluding object; and updating the partial representation of visible space based on the location of the occluding object.

13. The method according to claim 12, wherein controlling a movement of the machine based on the representation of visible space associated with the second time includes controlling the movement of a vehicle using one or more vehicle control systems.

14. The method according to claim 12, wherein determining a representation of visible space associated with the second time based on the combined occupancy grid associated with the first time and the sensor data associated with the second time includes
- determining a movement estimation associated with a dynamic occluding object;
- determining a predicted location of the dynamic occluding object at the second time; and
- updating the partial representation of visible space based on the predicted location of the dynamic occluding object.

15. The method according to claim 14, wherein determining a representation of visible space associated with the second time based on the combined occupancy grid associated with the first time and the sensor data associated with the second time includes
- combining each partial representation of visible space determined for each sensor to create the representation of visible space.

16. The method according to claim 12, wherein determining a representation of visible space associated with the second time based on the combined occupancy grid associated with the first time and the sensor data associated with the second time includes
- using a height estimation associated with an occluding object, determining whether a space over or under the occluding object is visible to a sensor of the plurality of sensors; and
- when the space over or under the occluding object is visible to the sensor, determining a space beyond the occluding object to be visible.

17. The method according to claim 12, wherein the representation of visible space associated with the second time includes a plurality of cells and each cell of the plurality of cells is associated with a count and is marked as visible or obscured.

18. The method according to claim 17, the method further comprising:
for each cell of the plurality of cells,
- when the cell represents a location not included in a most previous representation of visible space, setting a count associated with the cell to zero and mark the cell as obscured;
- when the cell is perceived as visible at the second time by a sensor of the plurality of sensors, increasing the count associated with the cell;
- when the cell is not perceived as visible by any sensor included in the plurality of sensors at the second time, decreasing the count associated with the cell;
- when the count associated with the cell is zero and a cell in the most previous representation of visible space associated with the cell is marked visible, marking the cell as obscured in the representation of visible space associated with the second time; and
- when the count associated with the cell is equal to a predetermined threshold and the cell in the most recent representation of visible space associated with the cell is marked obscured, marking the cell as visible in the representation of visible space associated with the second time.

* * * * *